UNITED STATES PATENT OFFICE.

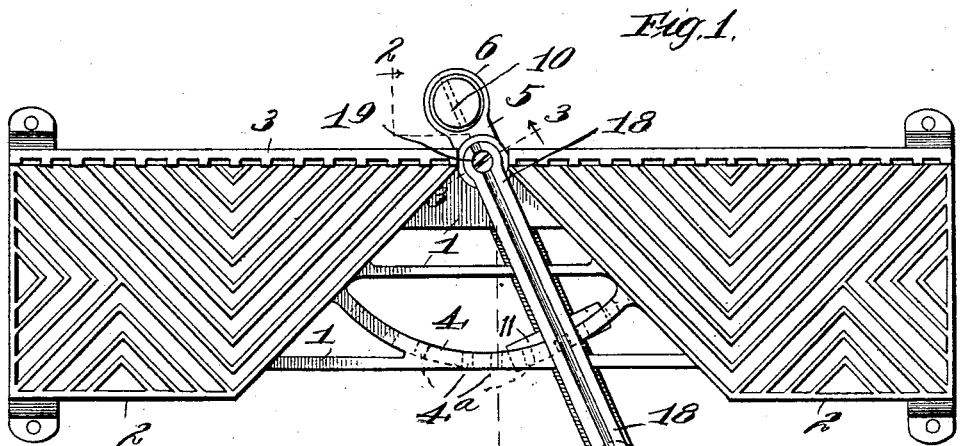

FRITZ PETERSON, OF ROCKFORD, ILLINOIS.

MITER-BOX.

968,973. Specification of Letters Patent. Patented Aug. 30, 1910.

Application filed July 30, 1907. Serial No. 386,298.

*To all whom it may concern:*

Be it known that I, FRITZ PETERSON, a citizen of the United States, residing at Rockford, in the county of Winnebago and State of Illinois, have invented certain new and useful Improvements in Miter-Boxes, of which the following is a specification.

The object of my invention is to provide means for adjustably tilting the saw of a miter box to and operatively supporting it at either side of the vertical plane that it normally occupies.

Referring to the accompanying drawings, which form a part of this specification, Figure 1 is a top plan view of a miter box provided with my improvements. Fig. 2 is a section, at the dotted line 2 2 in Fig. 1, of parts there shown, with other parts in elevation. Fig. 3 is a section, at the dotted line 3 3 in Fig. 1, of parts there shown. Fig. 4 is an enlarged view of parts shown in Fig. 3. Fig. 5 is a partial section, at the dotted line 5 5 in Fig. 3, of parts there shown.

1 is the base of the miter box and may be of the skeleton form shown or of any other suitable form. The base 1 supports bottom plates 2 and a back 3 fast thereto.

4 is a rack having notches $4^a$ therein to engage a part to be described hereinafter.

5 is a bolster carrying saw guides 6 and $6^a$ consisting of sockets 7 preferably integral with said bolster and pins 8 inserted into and slidable in said sockets. The saw guides 6 and $6^a$ are provided with the usual coincident slots 9 and 10 for the admission of the saw $10^a$.

11 (Fig. 2) is a rocker attached to and projecting from the upper side of the bolster 5, said rocker having a curved upper face which bears against the lower edge of the rack 4, upon which it turns slightly whenever said bolster is tilted.

12 (Figs. 2, 3 and 4) is an annular recess formed in the underside of the base 1 of the miter box.

13 is an annular recess formed in the upper side of the bolster 5 and registering with the recess 12 in the base 1.

14 is a bearing ring included within and substantially filling the recesses 12 and 13.

$14^a$ is a pin set into the bottom of the recess 13 to prevent the rotation of the ring 14 therein.

15 and 16 are screws tapped through the bottom of the bolster 5 and the bottom of the annular recess 13 and contacting the ring 14 resting therein.

One end of a bar 18 is attached to the bolster 5 by means of a screw 19, said screw extending through an opening 20 in said bar, an opening 21 in the base 1 and an opening 22 in the bolster. The other end of the bar 18 is fixed to the bolster by a screw 24. The screw 19 forms a pivot for the bolster. The bar 18 serves to support the bolster 5 upon the base 1. The diameter of the bore of the opening 21 in the base 1 is made somewhat larger than the diameter of the stem of the screw 19 in order to allow the same a slight lateral movement. The lower end of the screw 19 is preferably tapped into the lower end of the opening 22 in the bolster 5. After the screw 19 has been turned into the threaded portion of the opening 22 in the bolster 5 sufficiently to secure together somewhat loosely the parts through which it passes, in order to permit the requisite play between them, a lock-nut 23 is applied to its threaded end and turned up snugly against the under side of said bolster 5. Fig. 3 represents the parts as being secured together somewhat loosely as just described.

25 is a lever pivoted in a recess (not shown) in the bolster 5 at 26 and provided with a detent 27 adapted to engage the notches $4^a$ in the rack 4 and therethrough lock said bolster at any desired point of its horizontal movement on the pivot 19.

My invention enables the operator to tilt the saw $10^a$ to either side of the normal perpendicular plane that it occupies in the miter box. In Fig. 3 the saw is shown, in solid lines, as occupying such normal perpendicular plane. When it is desired to saw in such perpendicular plane, the screws 15 and 16 are turned up so as to hold the ring 14 against the walls of the groove 12, thus taking up the looseness shown to exist in Fig. 3.

When it is desired to saw in a plane slightly inclined from the perpendicular, the screw 16 is slackened and the screw 15 turned upward sufficiently to tilt the bolster 5 with the saw guides 6 and $6^a$ and saw $10^a$ into the position indicated in dotted lines in Fig. 3. Fig. 4 shows in solid lines the positions occupied by the bolster 5, the screws 15 and 16 and the ring 14 at the end of the tilting operation just described. Obviously if the screw 16, Fig. 3, were turned upward, instead of the screw 15, the bolster 5, guides 6 and 6ª and saw 10ª would be thereby tilted in a direction opposite to that indicated by the dotted lines in the latter figure. After the saw 10ª has been tilted to the desired inclination, in the manner already described, the bolster 5 may be swung horizontally on its pivot 19 to any desired position and there locked to the rack 4 by means of the detent 27 on the lever 25.

The employment of the ring 14 and screws 15 and 16, in conjunction with the recesses 12 and 13, results in maintaining a uniformly-operating connecting-bearing between the frame 1 of the miter box and its bolster 5, in any position to which the latter may be tilted and swung, within the limits of the device.

I claim as my invention:

1. In a miter box, in combination, a base having an annular recess formed in the under side thereof, a bolster having an annular recess formed in the upper side thereof coincident and registering with the recess in the base, a bearing ring included within said recesses, screws tapped through the bottom of the bolster and the bottom of the annular recess thereof and contacting the ring therein, a pivot extending through the base, bolster and center of the annular recesses therein at right angles thereto, and means on the bolster for supporting a saw.

2. In a miter box, in combination, a base; a saw-supporting means pivotally mounted on said base; and means at opposite sides of the pivotal center of said saw-supporting means for tilting the latter out of perpendicular position with reference to the base.

3. In a miter box, in combination, a base; a saw-supporting means; a pivot for pivotally attaching said means to said base; and adjusting screws for said saw-supporting means at opposite sides of said pivot, said screws being arranged to act against said base to tilt the saw supporting means.

4. In a miter box, in combination, a base; a saw-supporting means comprising a bolster underlying said base; a bar overlying said base; a pivot extending through said base, bolster and one end of said bar, the other end of said bar being attached to said bolster; and means for adjusting the position of said pivot.

5. In a miter box, in combination, a base; a saw-supporting means comprising a bolster; a screw for pivotally connecting said bolster to said base, said screw providing means for loosening and tightening the pivotal connection between the bolster and the base; and means for adjusting the position of said screw.

In testimony whereof I have signed my name to this specification in the presence of two subscribing witnesses.

FRITZ PETERSON.

Witnesses:
PEARL L. STOCKBURGER,
RICHARD F. LOCKE.